United States Patent [19]

Desgrandchamps et al.

[11] Patent Number: 4,596,699
[45] Date of Patent: Jun. 24, 1986

[54] APPARATUS FOR BURNING HYDROGEN SULPHIDE

[75] Inventors: Guy Desgrandchamps, Pau; Georges Kvasnikoff, Monein; Claude Blanc, Pau, all of France

[73] Assignee: Societe Nationale Elf Aquitaine (Production), Paris, France

[21] Appl. No.: 199,830

[22] Filed: Oct. 23, 1980

Related U.S. Application Data

[62] Division of Ser. No. 33,169, Apr. 25, 1979, abandoned.

[30] Foreign Application Priority Data

May 2, 1978 [FR] France ............................ 78 12899

[51] Int. Cl.[4] .................................................. C01B 17/50
[52] U.S. Cl. ....................................... 422/160; 422/195; 423/573 G
[58] Field of Search ............... 422/160, 161, 188, 189, 422/191, 193, 195, 190, 236, 239, 241; 423/573 G, 574 R

[56] References Cited

U.S. PATENT DOCUMENTS

| | | |
|---|---|---|
| 2,030,885 | 2/1936 | Maxim .............................. 422/160 |
| 2,867,506 | 1/1959 | Roberts ............................ 422/160 |
| 3,661,534 | 5/1972 | Reed ................................ 422/160 |
| 4,035,158 | 7/1977 | Scott et al. ..................... 422/160 |

*Primary Examiner*—Richard L. Chiesa
*Attorney, Agent, or Firm*—Burgess, Ryan & Wayne

[57] ABSTRACT

A process to produce sulphur from two acid gases both containing hydrogen sulphide and one of which contains ammonia, using a modified Claus technique.

The acid gas containing ammonia is burnt in the presence of air under substoichiometric conditions in a first heat-reaction chamber, while the ammonia-free acid gas is burnt in a second heat-reaction chamber, forming a series with the first chamber, with the right quantity of air to provide a molar ratio of $H_2S$ to $SO_2$ of approximately 2/1 at the catalytic reaction stage inlet. The mixed effluents from both heat-reaction chambers may pass through a high-temperature residence chamber before being conveyed to the heat-recovery stage.

Gas effluents from the heat-reaction stage contain $H_2S$ and $SO_2$ in the right ratio for the catalytic reaction stage, and no hydrocarbons or harmful quantities of $NH_3$ and NO.

3 Claims, 3 Drawing Figures

APPARATUS FOR BURNING HYDROGEN SULPHIDE

This is a division of application Ser. No. 33,169, filed Apr. 25, 1979, now abandoned.

This invention concerns a process to produce sulphur from two acid gases both containing hydrogen sulphide, and one of which also contains ammonia. It also concerns a thermal reactor which can be used to apply this process.

The Claus process is commonly used to produce sulphur from a gas, known as an acid gas, containing hydrogen sulphide. The process comprises a controlled oxidation of hydrogen sulphide by oxygen or air, followed by a catalytic oxidation by contact with a catalyst. The acid gas containing hydrogen sulphide is conveyed to a heat-reaction stage where a third of the hydrogen sulphide is converted into sulphur dioxide in the presence of oxygen or air, and a certain amount of sulphur is formed. The reaction gas mixture from the heat-reaction stage is then subjected to indirect cooling which allows the recovering of the calories it contains by generation of steam, and the cooled mixture is then dispatched to a condensation stage, where the sulphur in the gaseous mixture is separated out. Sulphur production, which at this point is still quite incomplete, is taken further by reheating the gaseous mixture from the condensation stage and conveying it to a catalytic reaction stage containing a suitable catalyst, in contact with which sulphur dioxide reacts with hydrogen sulphide to form a further quantity of sulphur. Catalytic conversion usually requires two or three catalytic zones, each preceded by a heater for the gaseous mixture to be treated, and followed by a condenser in which the sulphur is separated out. Residual gas from the final catalytic zone, which still contains small quantities of sulphuretted compounds such as hydrogen sulphide, sulphur dioxide, sulphur vapour, vesticular sulphur, carbon disulphide, or carbon oxysulphide, may pass through a purification stage which retains a further large proportion of such sulphur compounds, before being dispatched to an incineration stage for discharge into the atmosphere.

When acid gases containing hydrogen sulphide also contain less than 2% volume of ammonia, they can be treated by means of the Claus process as described above without any special measures being needed because of the presence of ammonia.

In refineries, there are generally two different grades of acid gas containing hydrogen sulphide, one containing a major proportion of hydrogen sulphide, a few percent hydrocarbons and no ammonia, while the other, with no hydrocarbons, contains hydrogen sulphide as well as much more than 2% volume of ammonia. For example, ammonia-free acid gas contains 93% volume of hydrogen sulphide, 2% hydrocarbons and 5% water, while the corresponding ammoniated acid gas contains 30% volume of hydrogen sulphide, 30% ammonia, and 40% water.

In such cases, although the ammonia-free acid gas can be treated by means of the normal Claus process, the same does not apply to ammoniated acid gas, which contains a significant amount of ammonia, and requires special precautions. For the Claus process, the need to maintain a molar ratio of $H_2S$ to $SO_2$ of approximately 2/1 in effluents from the heat-reaction stage requires combustion conditions under which the temperatures involved are inadequate for proper destruction of ammonia. The presence of even small quantities of unburnt ammonia in effluent from the heat-reaction stage inevitably results in the appearance of deposits of ammonium salts in parts of the Claus installation below the heat-reaction stage, particularly condensers and sulphur pit chambers. This can clog the equipment and cause stoppages.

To allow sulphur to be produced from acid gases containing hydrogen sulphide and a significant quantity of ammonia, it has been suggested that ammonia should be eliminated from the gas before it enters the Claus process installation. However, this increases the number of stages between acid gas and sulphur, which is an obvious disadvantage.

It has also been suggested that sulphur could be produced from acid gases containing hydrogen sulphide and a significant amount of ammonia by making special modifications to the Claus process, to provide combined treatment of the ammoniated acid gas and of another acid gas containing hydrogen sulphide and no ammonia.

For example, in a method described in French patent application No. 74 34019 (publication No. 2 247 421), the ammoniated acid gas is first mixed with the ammonia-free gas after preheating, so that the mixture of the two acid gases is at a temperature of at least 70° C., and more specifically about 80° C., as stipulated in the example, in order to prevent the appearance of solid ammonium salt deposits. The mixture is then injected at this temperature into a burner at the inlet to the heat-reaction stage of the Claus installation. This burner also receives the air needed for complete oxidation of ammonia into nitrogen, and for controlled oxidation of hydrogen sulphide into sulphur dioxide, so as to obtain a molar ratio of $H_2S$ to $SO_2$ of approximately 2/1 in heat-reaction stage effluents. The need to mix ammoniated acid gas and ammonia-free acid gas before the heat-reaction stage is a drawback to this method. Furthermore, combustion conditions, related to the need to obtain the molar ratio of $H_2S$ to $SO_2$ of approximately 2/1 in combustion effluents, mean that the temperature is too low for proper elimination of ammonia, and the temperature of the various surfaces of the installation in contact with combustion gases has to be kept above 150° C. to prevent deposits of solid ammonium salts resulting from the presence of unburnt ammonia in these gases.

In other methods, namely those described in German patent application No. 2 122 000 and U.S. Pat. Nos. 3,970,743, 4,035,158 and 4,038,036, the heat-reaction stage in the Claus process is divided into two reaction zones in series. The ammoniated acid gas, possibly mixed with part of the ammonia-free acid gas, is injected into a burner at the inlet to the first heat-reaction zone. This burner also receives the air needed for complete combustion of ammonia into nitrogen, and for controlled oxidation of hydrogen sulphide into sulphur dioxide, so as to obtain a molar ratio of $H_2S$ to $SO_2$ of approximately 2/1 in heat-reaction stage effluents, while the ammonia-free acid gas, or the remaining fraction of it, is admitted to the second heat-reaction zone, below the first zone. In this method, oxidation of a major proportion of hydrogen sulphide into sulphur dioxide creates a high temperature in the first heat-reaction zone, encouraging ammonia decomposition. The extra ammonia-free acid gas injected into the second heat-reaction zone is then used to adjust the molar ratio of H₂S to SO₂ to approximately 2/1 in heat-reaction stage effluents.

There is one major drawback in this procedure, however: the more or less permanent presence of hydrocarbons in the ammonia-free acid gas injected into the second heat-reaction zone. These hydrocarbons, deprived of the oxygen needed for their combustion, are consequently not eliminated. This results mainly in coking-up of catalysts in the catalytic reaction stage, reducing their activity, and discolouring the sulphur.

Another method, described in U.S. Pat. Nos. 3,877,879 and 3,957,960, uses a heat-reaction stage with two heat-reaction chambers of different sizes, operating in parallel. Effluents from both these chambers are mixed. The ammoniated acid gas is injected into the smaller heat-reaction chamber, with enough air to ensure a molar ratio of H₂S to SO₂ in the combustion gas of approximately 0.086. This method gives temperatures that help destroy ammonia without forming sulphur trioxide, in fact without forming nitric oxide, which could act as a catalyst to oxidize sulphur dioxide into sulphur trioxide as soon as the temperature drops below 1,100° C. In the larger heat-reaction chamber, the ammonia-free acid gas is burnt with the right amount of air to ensure a molar ration of H₂S to SO₂ of approximately 2/1 in the combined effluents from both chambers.

Experiments have revealed certain factors tending to show that this process produces unsatisfactory results. For example, investigation of variations in measurements of unburnt ammonia and nitric oxide in the combustion effluents produced by an ammoniated acid gas containing 42% volume of ammonia, 38% hydrogen sulphide and 20% water, with gases remaining in the combustion chamber for 1.2 seconds, in relation to the ratio $\rho$ of the quantity of air used for combustion to the theoretical quantity needed to oxidize all ammonia and hydrogen sulphide in the ammoniated acid gas into nitrogen and sulphur dioxide respectively. These variations are shown by curves A (ammonia content in relation to $\rho$) and B (nitric oxide content in relation to $\rho$) on FIG. 3 below.

These curves show that if the quantity of air used is much less than the theoretical quantity ($\rho$ less than 0.8), significant amounts of unburnt ammonia remain in combustion effluents (higher than 400 ppm in this case). On the other hand, when conditions to ensure proper elimination of ammonia ($\rho$ exceeding 0.8) are applied, large amounts of nitric oxide appear (more than 100 ppm in this case). In order to obtain a molar ratio of H₂S to SO₂ of approximately 0.086 at the ammoniated acid gas combustion chamber outlet, $\rho$ has to be more than 0.9 and less than 1, and the large amounts of nitric oxide that form under these conditions need to be destroyed. The parallel arrangement of the two heat-reaction chambers does not allow effluents from them to be mixed closely, and they cannot be kept at a high temperature for long enough to quarantee proper reduction of the nitric oxide that forms.

Another drawback of this process with parallel heat-reaction chambers is that it is unsuitable unless the flow of ammoniated acid gas is very small compared with the flow of ammonia-free acid gas. It is only under these conditions that a stable flame can be maintained in the heat-reaction chamber containing the ammonia-free acid gas while ensuring a molar ratio of H₂S to SO₂ of approximately 2/1 in the combined effluents from both heat-reaction chambers. If the flow of ammoniated acid gas exceeds the flow of ammonia-free gas, it is no longer feasible to obtain a very low molar ratio of H₂S to SO₂ (approximately 0.086, corresponding to $\rho = 0.8$ to 1) in the ammoniated acid gas combustion effluents, since it will be impossible, without using a third acid gas source, to re-establish a ratio of approximately 2/1 in the combined effluents entering the catalytic reaction stage.

This invention concerns a process to produce sulphur from acid gases containing hydrogen sulphide and a significant quantity of ammonia (or of a compound such as HCN which converts easily into ammonia), by applying a special Claus technique for combined treatment of the ammoniated acid gas with an ammonia-free acid gas, involving a heat-reaction stage comprising a series of two heat-reaction chambers. This process overcomes the inadequacies of earlier methods, in particular by ensuring proper elimination of ammonia in the heat-reaction stage while minimizing formation of nitric oxide and sulphur trioxide, allowing any ammoniated acid gas, regardless of its ammonia content, and any amount of such gas in relation to the amount of ammonia-free acid gas, to be treated, and removing problems resulting from the presence of hydrocarbons in the ammonia-free acid gas.

In the following description and claims, the expression "ammoniated acid gas" refers to a gas containing hydrogen sulphide and ammonia or a compound such as HCN which converts easily into ammonia, while the expression "ammonia-free acid gas" refers to a gas containing hydrogen sulphide but no ammonia or compounds converting easily to produce ammonia.

This new process to produce sulphur from two acid gases, one containing ammonia and the other containing no ammonia, is a Claus-type process comprising a heat-reaction stage followed by an indirect gas-cooling stage which generates steam, and then by a catalytic reaction stage, in which process the ammoniated acid gas is burnt with air in a first heat-reaction chamber and the ammonia-free acid gas is injected into a second heat-reaction chamber to which effluents from the first chamber are admitted, the said process being characterized by the fact that the quantity of air injected into the first heat-reaction chamber is such that the ratio of this quantity of air to the theoretical quantity needed for total combustion of hydrogen sulphide and ammonia in the ammoniated acid gas into sulphur dioxide and nitrogen respectively is less than 1, that this chamber is kept at a temperature of 1,350° to 1,550° C., and that the ammonia-free acid gas is burnt in the second heat-reaction chamber with a quantity of air such that the molar ratio of H₂S to SO₂ at the catalytic reaction stage inlet is approximately 2/1, this second heat-reaction chamber being kept at a temperature of 1,000° to 1,500° C.

When the molar flow-rate of hydrogen sulphide in the ammonia-free acid gas entering the second heat-reaction chamber is at least twice the molar flow-rate of hydrogen sulphide in the ammoniated acid gas entering the first heat-reaction chamber, the temperature in the first heat-reaction chamber is maintained by burning the ammoniated acid gas with a quantity of air such that $\rho$ is between 0.7 and 1.

When the molar flow-rate of hydrogen sulphide in the ammonia-free acid gas entering the second heat-reaction chamber is less than twice the molar flow-rate of hydrogen sulphide in the ammoniated acid gas entering the first heat-reaction chamber, the temperature in the first heat-reaction chamber is maintained by burning the ammoniated acid gas with a quantity of air such that $p$ is between 0.4 and 0.7, after the ammoniated acid gas and said quantity of air have first been heated to 150° to 250° C.

In a recommended embodiment of this new process, effluent gases from the second heat-reaction chamber pass through a gas-residence chamber, are kept at a temperature of 1,000° to 1,500° C., before being conveyed to the cooling stage preceding the catalytic reaction stage.

Gases can remain in each of the heat-reaction chambers and high-temperature residence chamber for quite widely varying periods of time, and these periods may be quite different or quite similar from one chamber to another. Recommended durations of these periods are principally between 0.2 and 1.2 second.

The ammonia-free acid gas injected into the second heat-reaction chamber may contain an overall concentration of 0.4 to 15% volume of hydrocarbons, and more specifically between 1 and 5%.

In the version of this new process in which the ammoniated acid gas and corresponding air are preheated, this preheating is preferably done by indirect heat exchange with steam produced during the cooling stage of effluents from the heat-reaction chambers.

The invention also concerns a thermal reactor which, among other things, can be used as the heat-reaction stage of a Claus unit to produce a combustion effluent containing hydrogen sulphide, sulphur dioxide and sulphur from two acid gases containing hydrogen sulphide, and more specifically from two acid gases, one containing ammonia and the other containing no ammonia.

This thermal reactor, of the type comprising a first approximately cylindrical chamber made of refractory material, with one closed end equipped with an axial, radial or tangential burner containing a system to admit the first acid gas, specifically the ammoniated acid gas, and air, and with the other end containing an opening forming an outlet, and also comprising a second approximately cylindrical chamber made of refractory material, located on the same axis as the first chamber and below it on the circuit, this second chamber containing an inlet opening at the end nearer the first chamber and communicating with the outlet from this first chamber, and also containing an outlet opening at the other end, is characterized by the fact that the second chamber inlet and first chamber outlet communicate through a cellular partition made of refractory material, and that the second chamber is equipped with a radial or tangential burner containing a system to admit the second acid gas, specifically the ammonia-free acid gas, and air.

In one recommended embodiment, the thermal reactor also comprises a third approximately cylindrical chamber made of refractory material, located on the same axis as the other two chambers and below the second chamber on the circuit, this third chamber containing an inlet opening at the end nearer the second chamber and communicating with the second chamber outlet through a cellular partition made of refractory material, and containing another opening at the other end, forming the thermal reactor outlet.

In one recommended embodiment, the different chambers in the thermal reactor are all placed inside the same metal casing.

These thermal reactor chambers may be of different sizes, although their dimensions should preferably be such that gases remain in the different chambers for very similar periods of time.

The second chamber outlet, in the case of a two-chamber reactor, or third chamber outlet, in the case of a three-chamber reactor, forms the thermal reactor outlet. In a Claus unit, this outlet generally communicates with the inlet to a heat-recuperation steam generator, involving indirect heat exchange with hot combustion gases from the thermal reactor.

The invention will be described in greater detail below, with references to the accompanying figures.

Figure 3:
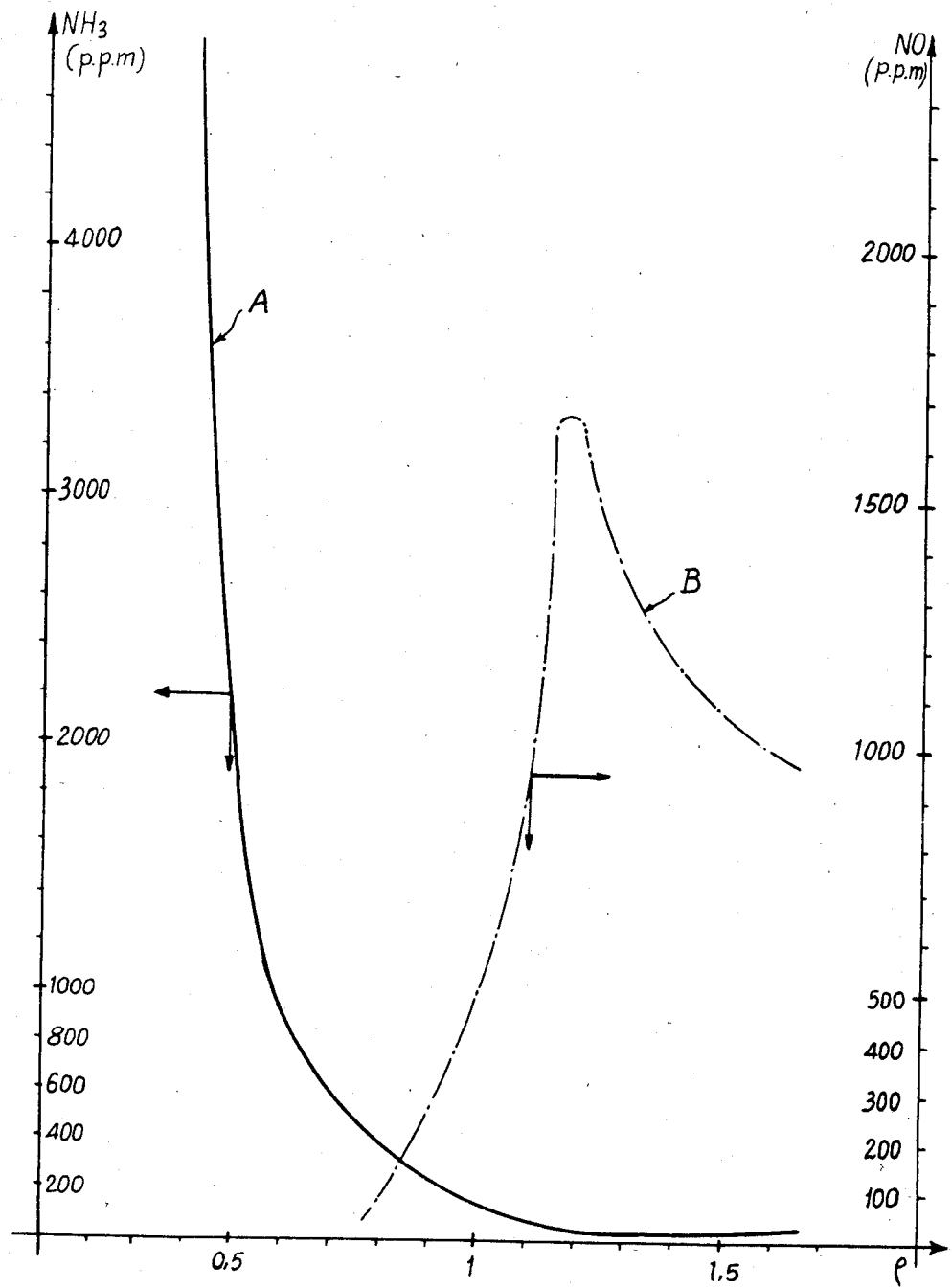

FIG. 3, as already mentioned, shows curves representing variations in the amounts of unburnt ammonia (curve A) and nitric oxide (curve B) in combustion effluents from an ammoniated acid gas containing 42% volume of ammonia, 38% hydrogen sulphide, and 20% water, with gas remaining in the combustion zone for 1.2 seconds, in relation to the ratio $p$ of the quantity of air used for combustion to the theoretical quantity needed to oxidize all ammonia and hydrogen sulphide in the ammoniated acid gas into nitrogen and sulphur dioxide respectively.

Figure 1:
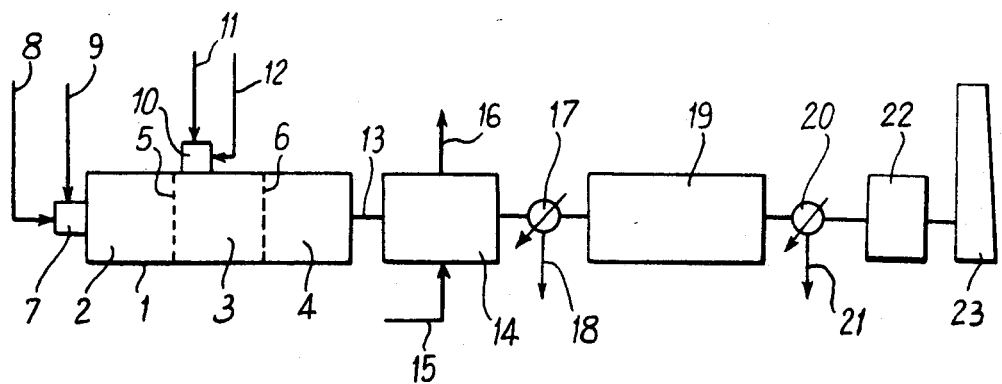
FIG. 1 shows the general layout of an installation to apply this new process.

The installation shown in FIG. 1 consists of a thermal reactor 1 containing a first heat-reaction chamber 2, a second heat-reaction chamber 3, and a high-temperature residence chamber 4. These chambers, all made of refractory material, are arranged in a series in this order, each communicating with the following one through cellular partitions 5 and 6, also made of refractory material. The first heat-reaction chamber is equipped with an axial burner 7, containing a pipe 8 to admit the first acid gas (in this case the ammoniated acid gas), and an air-admission pipe 9. The second heat-reaction chamber is equipped with a radial burner 10 opening into the chamber near the cellular partition 5, and containing a pipe 11 to admit the second acid gas (in this case the ammonia-free acid gas) and an air-admission pipe 12. The thermal reactor outlet, in other words, the outlet from the last heat-reaction chamber, is connected by a pipe 13 to a heat-recuperation steam generator 14. This functions by indirect heat exchange, using water admitted through a pipe 15 to produce steam, which leaves the boiler through a pipe 16. Sulphur is separated at the steam generator outlet in a condenser 17, which is equipped with a liquid sulphur outlet pipe 18. The condenser outlet is connected to the inlet of a catalytic reaction stage 19, which normally contains two or three catalytic chambers arranged in a series, each preceded by a heater to heat the gas mixture, and followed by a sulphur-separation condenser. The figure shows the condenser 20 located after the last catalytic chamber, containing a liquid sulphur outlet pipe 21. This condenser is followed by an incinerator 22 connected to a chimney stack 23. Monitoring and regulating devices of a type known in the previous art, and not shown here, are used to keep the temperature in the first heat-reaction chamber at the required level by adjusting the ratio of the flows of ammoniated acid gas and air admitted through the burner 7, and to keep the molar ratio of $H_2S$ to $SO_2$ at the catalytic reaction stage inlet at or near 2/1, by adjusting the ratio of flows of ammonia-free gas and air admitted to the second heat-reaction chamber through the burner 10.

Figure 2:
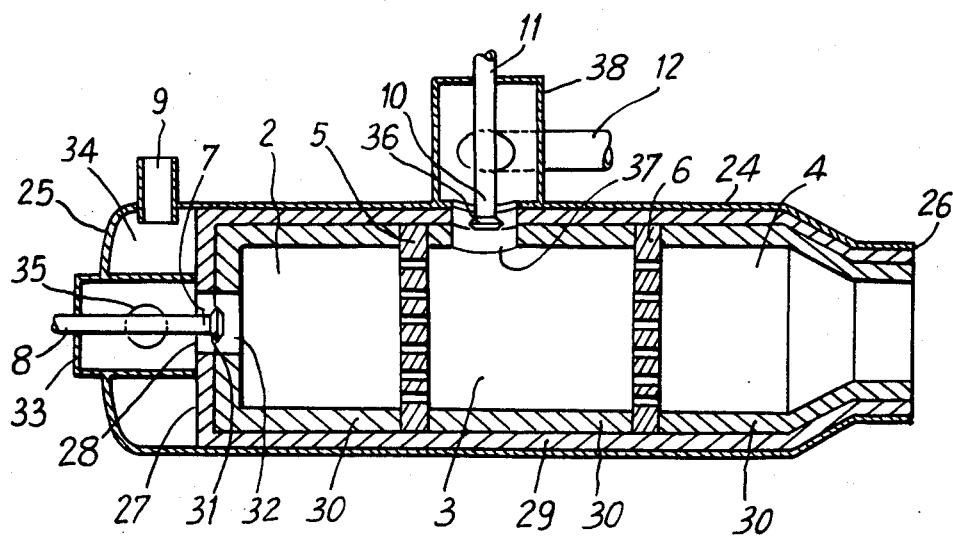
FIG. 2 shows a diagrammatical cross-section of a thermal reactor which can be used as the heat-reaction stage of this new process; this cross-section is drawn along a vertical plane passing through the reactor axis.

FIG. 2 shows a more detailed view of the thermal reactor in FIG. 1. It comprises a mainly cylindrical metal casing of cover 24 with one closed end 25 and one open end 26. Near the closed end there is a transverse metal partition 27 containing a central opening 28. Between the metal partition 27 and the open end 26, the metal casing 24 is lined inside with a first layer of refractory material 29, which also extends over the transverse metal partition. Two cellular partitions 5 and 6 made of refractory material, placed at right angles to the lengthwise centre line of the casing, and a second layer of refractory material 30, lining the inside of the first layer, form three zones inside the casing, a first heat-reaction zone 2, a second heat-reaction zone 3, and a high-temperature gas residence zone 4. Each of these zones communicates with the following one through the corresponding cellular partition. At the end of heat-reaction chamber 2 furthest from chamber 3, there is an axial burner 7 containing a burner head 31 connected to an ammoniated acid gas inlet pipe 8 and opening through the partition 27 into a passage 32 through refractory layers 29 and 30, into the heat-reaction chamber 2. A tubular casing 33 surrounding the burner 7, together with the closed end 25 of the main casing and the partition 27, form a space 34 into which opens an air-inlet pipe 9, and which communicates with the passage 32 through openings such as 35 in the tubular casing. A radial burner 10 is fitted to the casing 24 in such a way that the burner head 36, which is connected to an ammonia-free acid gas inlet pipe 11, opens into a radial passage 37 through the wall of the casing 24 and refractory layers 29 and 30 into the heat-reaction chamber 3, near the cellular partition 5. The burner 10 is surrounded by a tubular casing 38 into which an air-inlet pipe 12 opens at a tangent. The open end 26 of the thermal reactor, which is also the outlet from the high-temperature gas residence chamber 4, is fitted with a system (not shown here) to connect the thermal reactor outlet with the Claus installation heat-recuperation steam generator.

This new process is performed in the following way.

The ammoniated acid gas is admitted to the burner 7 along pipe 8, while the necessary quantity of air is admitted through pipe 9, space 34 and openings 35 into the annular space 32. The resulting combustible mixture is burnt and the combustion gas remains between 0.2 and 1.2 second in the first heat-reaction chamber 2, before passing into the second heat-reaction chamber 3, through the cellular partition 5. The temperature in the first heat-reaction chamber is regulated to the required level between 1350° and 1500° C. by adjusting the ratio of the flows of ammonia-free acid gas and air admitted to this chamber. The ammoniated acid gas and corresponding air can be injected into the first heat-reaction chamber 2 either without preheating, or after preheating to 150° to 250° C. The ammonia-free acid gas is admitted to the burner 10 through pipe 11, while the quantity of air needed to obtain a molar ratio of $H_2S$ to $SO_2$ of approximately 2/1 in combustion gases at the catalytic reaction stage inlet is admitted through pipe 12 into the passage 37. The resulting combustible mixture burns, and combustion gases are mixed in the second heat-reaction chamber 3 with the combustion effluents from the first chamber 2. The combustion gas mixture remains in this second chamber 3 for between 0.2 and 1.2 seconds, before passing through the cellular partition 6, which improves the quality of the mixture, and remaining for a further 0.2 to 1.2 seconds in the high-temperature residence chamber 4, where the temperature is still above 1,000° C. The reaction mixture from the thermal reactor undergoes initial cooling in the steam generator 14 and is then cooled more throughly in the condenser 17, where part of the sulphur in the reactive mixture is condensed and can be removed through pipe 18. The reaction mixture leaving the condenser 17 is then reheated, and passes into the catalytic conversion stage, where the hydrogen sulfide and sulphur dioxide it still contains are converted into sulphur. On leaving the catalytic conversion stage, the gas mixture passes into the condenser 20, to separate out the sulphur, then into the incinerator 22, to convert final traces of sulphuretted compounds into sulphur dioxide before discharge into the atmosphere through chimney stack 23. The molar ratio of $H_2S$ to $SO_2$ at the catalytic conversion stage inlet is kept at or near 2/1 by adjusting the ratio of flows of ammonia-free acid gas and air admitted into heat-reaction chamber 3.

In the first heat-reaction chamber 2, combustion of ammoniated acid gas takes place under reducing conditions, so that the molar ratio of $H_2S$ to $SO_2$ in effluents from this chamber is not more than 2. This minimizes or prevents formation of nitric oxide. In addition, the temperature of between 1,350° and 1,550° C. in this chamber ensures high-speed ammonia decomposition. The radial or tangential burner in the second heat-reaction chamber 3 is supplied with ammonia-free acid gas, which generally has a high hydrogen sulphide content, and with enough air flow to ensure that the molar ratio of $H_2S$ to $SO_2$ in combustion effluents reaching the catalytic reaction stage inlet is approximately 2/1. The oxygen available in the second heat-reaction chamber 3 and the high temperature mean that hydrocarbons in the ammonia-free acid gas are burnt in this chamber. Any remaining traces of unburnt ammonia in effluents from the first heat-reaction chamber 2 remain for a further 0.2 to 1.2 seconds in the second heat-reaction chamber 3, at a temperature that helps decompose and consequently remove them. In addition, any traces of nitric oxide that have formed in the first heat-reaction chamber 2 are eliminated by the strongly reducing conditions and high temperature prevailing in the second heat-reaction chamber 3. As the combustion effluents of the ammoniated and ammonia-free acid gases pass through the high-temperature residence chamber 4, before being cooled in the heat-recuperation steam generator, they become mixed more closely, and any final traces of ammonia and nitric oxide are destroyed. At the outlet from the heat-reaction stage in which the characteristic features of this invention are to be found, combustion effluents no longer contain any troublesome quantities of ammonia, nitric oxide or sulphur trioxide.

The following examples concern certain possible embodiments of the invention, in order to illustrate the description above.

EXAMPLE 1

Test were carried out to produce sulphur from two acid gases, one of which contained 30% volume of ammonia, 30% hydrogen sulphide, and 40% water while the other contained no ammonia, but 92% volume of hydrogen sulphide, 2.5% hydrocarbons, and 5.5% water.

A pilot unit similar to the one described above and shown in FIGS. 1 and 2 was used, in other words a thermal reactor containing two heat-reaction chambers and a high-temperature gas residence chamber.

The ammoniated acid gas and corresponding combustion air were admitted to the burner in the first heat-reaction chamber without preheating and at molar flow-rates of 20 moles/hr and 51.4 moles/hr respectively, thus enough air to ensure that $p$ was equal to 0.8. The temperature in this first heat-reaction chamber was approximately 1,450° C.

The ammonia-free acid gas and corresponding combustion air were admitted to the burner in the second heat-reaction chamber, at molar flow-rates of 33 moles/hr and 57.3 moles/hr respectively, giving a molar ratio of $H_2S$ to $SO_2$ of approximately 2/1 at the catalytic reaction stage inlet. The temperature in this second heat-reaction chamber was approximately 1,230° C.

The combined ammonia-free acid gas and ammoniated acid gas combustion effluents then passed through the third chamber, the gas residence zone, at a temperature of approximately 1,230° C., before dispatch to the heat-recuperation steam generator.

Combustion gases remained in each heat-reaction chamber and the residence chamber for approximately 0.5 second.

Ammonia, nitric oxide and hydrocarbon contents, expressed in volumes per million (vpm), in gas effluents from each heat-reaction chamber (Nos. 1 and 2) and the gas residence chamber (No. 3), are shown in the following table.

TABLE

|  | N° 1 | N° 2 | N° 3 |
|---|---|---|---|
| $NH_3$ | 400 | 68 | 45 |
| NO | 83 | 12 | 6 |
| Hydrocarbons | nil | i.d.* | n.d.* |

*not detectable

Effluents from the first heat-reaction chamber still contain unburnt ammonia as well as small quantites of nitric oxide, which forms despite the substoichiometric combustion conditions in this chamber.

Effluents from the second heat-reaction chamber contain only very small amounts of unburnt ammonia (approximately 68 vpm) and traces of nitric oxide (approximately 12 vpm). Analysis of the gas effluents from the gas residence chamber (No. 3) shows that reduction of nitric oxide continues in this chamber (approximately 6 vpm remaining).

After 700 hours' operation, no deposits were to be found on the sides of parts of the unit beyond the thermal reactor and in contact with gases.

EXAMPLE 2

With a unit similar to the one used in Example 1, tests were carried out to produce sulphur from two acid gases, one of which contained 30% volume of ammonia, 30% hydrogen sulphide, and 40% water, while the other contained no ammonia, but 92% volume of hydrogen sulphide, 2.5% hydrocarbons, and 5.5% water.

The ammoniated acid gas and corresponding combustion air, both preheated to a temperature of 210° C., were admitted to the burner in the first heat-reaction chamber at molar flow-rates of 29 moles/hr and 46.7 moles/hr respectively, thus enough air to ensure that $p$ was equal to 0.5. The temperature in this first heat-reaction chamber was approximately 1,360° C.

The ammonia-free acid gas and corresponding combustion air were fed to the burner in the second heat-reaction chamber at molar flow-rates of 16.5 moles/hr and 49.5 moles/hr respectively, giving a molar ratio of $H_2S$ to $SO_2$ of approximately 2/1 at the catalytic reaction stage inlet. The temperature in this second heat-reaction chamber was approximately 1,400° C.

The combined ammonia-free acid gas and ammoniated acid gas combustion effluents then passed through the third chamber, the gas residence zone, at a temperature of approximately 1,400° C., before dispatching the heat-recuperation steam generator.

Combustion gases remained in each heat-reaction chamber and the residence chamber for approximately 0.5 second.

Analysis of effluent gas from the residence chamber revealed no harmful quantities of ammonia, nitric oxide of sulphur trioxide. In addition, no deposits of carbon black were observed on catalysts in the catalytic reaction zone, and the sulphur produced showed no discoloring.

What is claimed is:

1. A thermal reactor for producing a combustion effluent containing hydrogen sulphide, sulphur dioxide and sulphur from two acid gas streams containing hydrogen sulphide, one of said gas streams containing ammonia and the other containing no ammonia, said reactor comprising (a) a first approximately cylindrical chamber having an interior made of refractory material, having one closed end equipped with a burner means to admit the ammonia containing gas, and air, the other end containing an opening forming an outlet, (b) a second substantially cylindrical chamber having an interior made of refractory material, located on the same axis as the first chamber having an inlet in communication with the outlet of said first chamber through a cellular partition made of refractory material and an outlet opening at the other end, said second chamber being equipped with a burner having means to admit the ammonia-free acid gas, and air.

2. A thermal reactor for producing a combustion effluent containing hydrogen sulphide, sulphur dioxide and sulphur from two acid gas streams containing hydrogen sulphide, one of said gas streams containing ammonia and the other containing no ammonia, said reactor comprising (a) a first approximately cylindrical chamber having an interior made of refractory material, having one closed end equipped with a burner means to admit the ammonia containing gas, and air, the other end containing an opening forming an outlet, (b) a second substantially cylindrical chamber having an interior made of refractory material, located on the same axis as the first chamber having an inlet in communication with the outlet of said first chamber through a cellular partition made of refractory material and an outlet opening at the other end, said second chamber being equipped with a burner having means to admit the ammonia-free acid gas, and air and (c) a third substantially cylindrical chamber having an interior made of refractory material, located on the same axis as the aforesaid two chambers having an inlet opening in communication with the second chamber outlet through a cellular partition made of refractory material, and an outlet opening at the other end, forming the thermal reactor outlet.

3. A reactor according to claim 1 or 2 wherein the different chambers in the thermal reactor are within the same metal casing.

* * * * *